United States Patent [19]

Claret

[11] Patent Number: 5,595,138

[45] Date of Patent: Jan. 21, 1997

[54] APPARATUS FOR DETECTING OPERATIONAL ANOMALIES IN PRESSURIZED FLUID CIRCUITS

[75] Inventor: Pierre J. E. Claret, Nandy, France

[73] Assignee: Societe Nationale D'Etude et de Construction de Moteurs D'Aviation S.N.E.C.M.A., Paris Cedex, France

[21] Appl. No.: 472,848

[22] Filed: Jun. 7, 1995

[30] Foreign Application Priority Data

Jun. 8, 1994 [FR] France ................... 94 06986

[51] Int. Cl.⁶ .................................................. G01L 19/12
[52] U.S. Cl. ................ 116/268; 116/272; 116/DIG. 42; 340/607
[58] Field of Search ................... 340/607, 606, 340/611; 417/313, 63, 244, 426; 137/558; 116/268, 272, DIG. 42

[56] References Cited

U.S. PATENT DOCUMENTS

| | | | |
|---|---|---|---|
| 3,200,787 | 8/1965 | Darnell | 116/268 |
| 4,133,621 | 9/1978 | Frank | 210/167 |
| 4,899,535 | 2/1990 | Dehan et al. | 60/39.08 |

Primary Examiner—Jeffrey Hofsass
Assistant Examiner—Julie B. Lieu

[57] ABSTRACT

The present invention relates to an apparatus for detecting operational anomalies in a pressurized fluid circuit having a main pump, a fluid filter and a booster pump connected in series. The apparatus has an indicating detector to provide an indication of a system malfunction and a switching device connected to the indicating detector, as well as to various points in the pressurized fluid circuit, to enable the indicating detector to detect a malfunction in either the booster pump or the filter. The switching device has pressurized fluid inlets connected to a point upstream of the booster pump, a point between the booster pump and the filter inlet and to a point between the filter outlet and the inlet of the main, high pressure pump. The switching device monitors the pressure drop between the inlet and outlet of the fluid filter and, should the filter become clogged, when the pressure drop across the filter reaches a predetermined threshold value, the indicating detector will automatically indicate such a malfunction to the fluid circuit user. Similarly, the switching device will also detect a malfunction in the booster pump so as to cause the indicating detector to indicate such a malfunction.

8 Claims, 2 Drawing Sheets

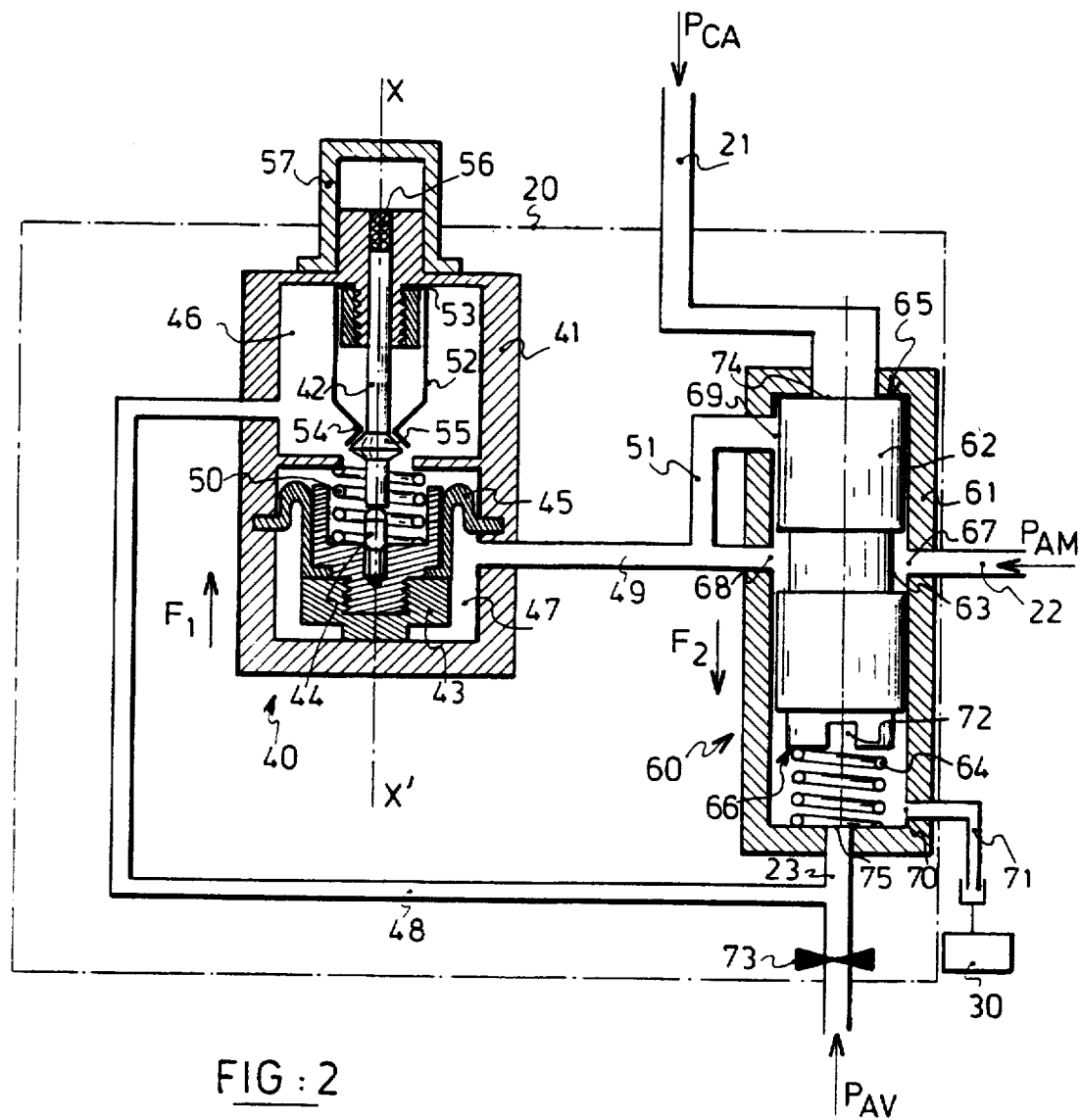
FIG:2

APPARATUS FOR DETECTING OPERATIONAL ANOMALIES IN PRESSURIZED FLUID CIRCUITS

BACKGROUND OF THE INVENTION

The present invention relates to an apparatus for detecting operational anomalies in a pressurized fluid circuit, more particularly in a fuel or oil feed circuit wherein a main pressure pump is supplied by a booster pump through a filter.

It is well known in the art that high pressure fluid pumps are susceptible to cavitation which occurs when fluid flow into the high pressure pump inlet is inadequate. In order for a high pressure pump to operate optimally and remain in good condition, it must be supplied with fluid at a sufficiently high pressure. Accordingly, such systems incorporating high pressure pumps typically have a booster pump to deliver the fluid at a boosted pressure higher than a critical value into the inlet of the high pressure pump and to also include a filter in the circuit between the booster pump and the high pressure pump.

A number of different devices are available to check on the condition of the filter, such devices typically detecting the pressure drop between the inlet and the outlet of the filter to determine the condition of the filter. Furthermore, known devices are available to check the operating condition of a booster pump such that any failure of the booster pump may be remedied by using an auxiliary fluid source.

However, the various known devices are dedicated to monitoring and detecting anomalies in only one of the components of the pressurized fluid circuit of the main pump and do not allow the simultaneous monitoring of the condition of both the booster pump and the filter. Such simultaneous monitoring can be carried out only by using two independent monitoring systems which increase the complexity and the mass of the high pressure fluid circuit.

SUMMARY OF THE INVENTION

The present invention relates to an apparatus for detecting operational anomalies in a pressurized fluid circuit having a main pump, a fluid filter and a booster pump connected in series. The apparatus has an indicating detector to provide an indication of a system malfunction and a switching device connected to the indicating detector, as well as to various points in the pressurized fluid circuit, to enable the indicating detector to detect a malfunction in either the booster pump or the filter. The switching device has pressurized fluid inlets connected to a point upstream of the booster pump, a point between the booster pump and the filter inlet and to a point between the filter outlet and the inlet of the main, high pressure pump. The switching device monitors the pressure drop between the inlet and outlet of the fluid filter and, should the filter become clogged, when the pressure drop across the filter reaches a predetermined threshold value, the indicating detector will automatically indicate such a malfunction to the fluid circuit user. Similarly, the switching device will also detect a malfunction in the booster pump so as to cause the indicating detector to indicate such a malfunction.

The present invention obviates the drawbacks of the known anomaly detection apparatus and allows automated and simultaneous monitoring of the state of the filter and the condition of the booster pump.

The apparatus according to the present invention monitors and detects operational anomalies in a pressurized feed circuit having a main pump wherein the pressurized feed circuit also has at least two series-mounted hydraulic components, typically consisting of a booster pump and a filter. The invention is characterized in that it has an indicating detector associated with a switching device. The indicating detector comprises a case having first and second internal chambers separated by a flexible membrane and an alarm indicator extending externally of the case when the pressure differential between the first and second chambers reaches a predetermined threshold value. The switching device also comprises a case having first and second opposite ends and a slider movable within the switching device case between the opposite ends, the slider having a middle portion with a reduced cross-sectional dimension. The switching device case has a first inlet in the first end, a second inlet in the second end and third inlet in a middle portion of the case. The first inlet is connected to a point in the fluid circuit upstream of the booster pump such that the pressurized fluid is applied to one end of the slider. The second inlet is connected to a point in the fluid circuit between the filter outlet and the inlet of the main pump such that the pressure of the fluid at this point is applied to the second end of the slider. The third inlet is connected to a point in the fluid circuit between the outlet of the booster and the inlet of the filter such that the pressurized fluid is normally applied to the interior of the switching device case at the reduced cross-sectional portion of the slider.

The pressurized fluid between the outlet of the filter and the inlet of the main pump is also applied to the first chamber of the indicating detector. The switching device will automatically apply one of the other two pressurized fluids to the second chamber of the indicating detector. The detector will indicate a malfunction in the fluid system when the pressure differential between the first and second chambers reaches a predetermined threshold value.

BRIEF DESCRIPTION OF THE DRAWINGS

FIG. 2 is a cross-sectional view of the apparatus according to the present invention.

DETAILED DESCRIPTION OF THE PREFERRED EMBODIMENT

Figure 1:
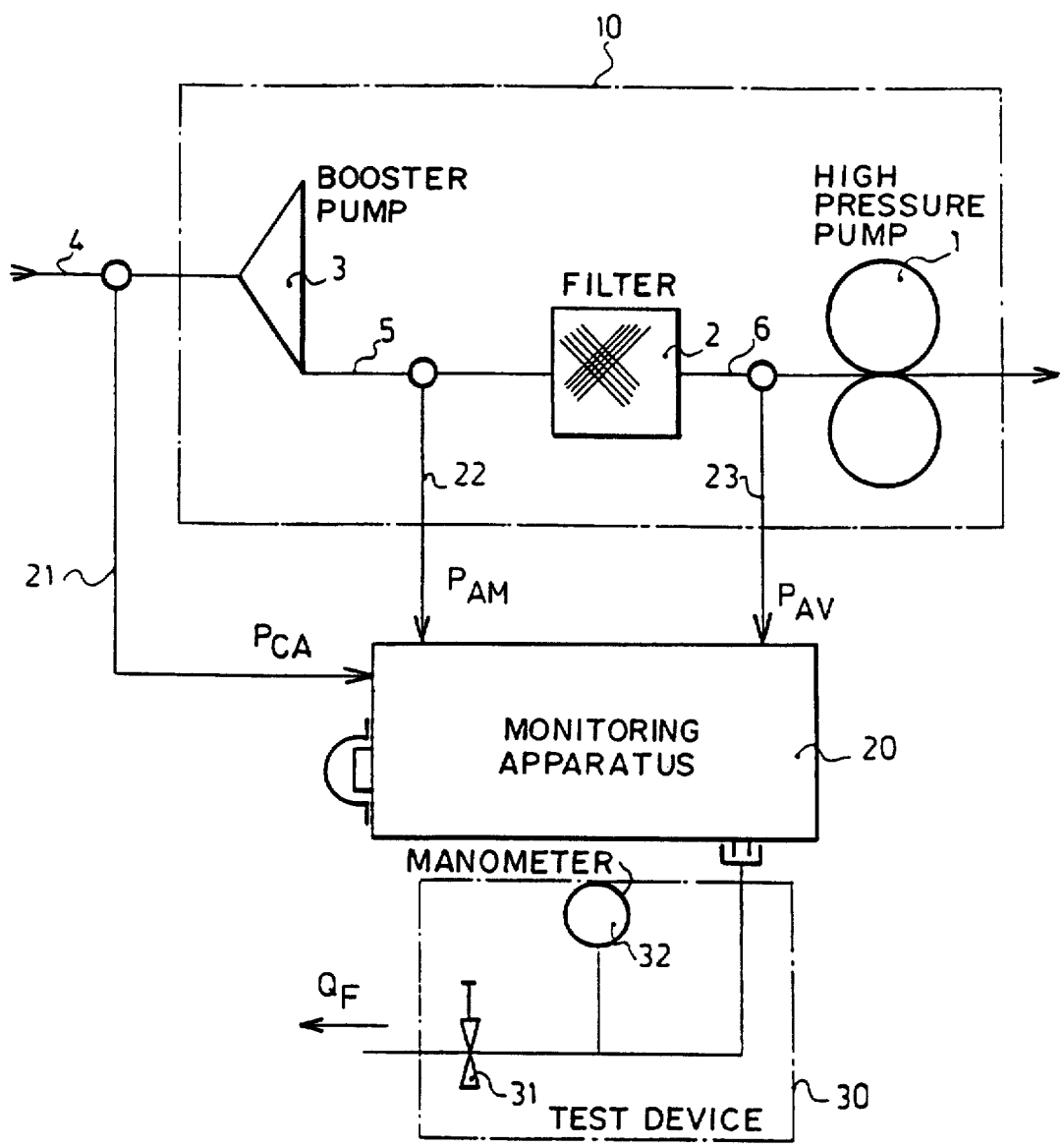
FIG. 1 is a schematic diagram of a fuel pump circuit fitted with the detecting apparatus according to the present invention.

FIG. 1 schematically illustrates a fuel pump assembly in a fuel feed circuit fitted with the detection apparatus according to the present invention. The fuel pump assembly 10 comprises a high pressure main pump 1 fed through a filter 2 from a low-pressure booster pump 3 which is, in turn, connected to a conduit 4 from a fluid supply source (not shown). The monitoring apparatus 20 is connected to the conduit 4 upstream of the booster pump 3 via conduit 21; to the conduit 5 between the low pressure booster pump 3 and the filter 2 by conduit 22; and to the conduit 6 downstream of the filter, but upstream of the main, high pressure pump 1 by conduit 23. The monitoring apparatus 20 is fitted with a test device 30 comprising a valve 31 and a manometer 32. The monitoring apparatus 20 is used to detect and warn of any anomalous operation which might entail cavitation at the intake of the high pressure pump 1. Such an anomalous operational condition may be caused by a clogged filter 2, or by a drive failure of the booster pump 3.

The apparatus according to the present invention simultaneously monitors the condition of the filter 2 and the condition of the booster pump 3. In the event of an anomaly, the apparatus automatically selects for monitoring the pressure drop which is linked to the malfunctioning component. When the monitored pressure drop exceeds a predetermined threshold value, an alarm signal will be emitted from the apparatus. The alarm signal may be an electrical signal transmitted to a display at a monitoring station, a pilot light linked to the apparatus and indicating to a maintenance crew that action is required, or any other desired indicating method. The test device 30 is used during maintenance procedures, when there is an anomaly, to ascertain if the reference pressure differential threshold is proper and that the detected anomaly does not arise in the monitoring apparatus itself.

FIG. 2 is a cross-sectional view of an illustrative embodiment of the monitoring apparatus according to the invention. The apparatus 20 comprises an indicating detector 40 operatively associated with a switching device 60. The switching device 60 will automatically select for monitoring the pressure drop related to the malfunctioning component. The indicating detector 40 will display the malfunction when the selected pressure drop exceeds a predetermined threshold value.

The indicating detector 40 comprises a case 41 with a generally cylindrical configuration extending about longitudinal axis XX' and having an open end through which a display rod 42 may pass externally of the case 41. Locking means 52, 55 cooperates with the display rod 42 and will hold the display rod 42 in its extended position indicating a malfunction in the fluid system. Piston 43 is fitted with means 44 to drive the display rod 42 from its retracted position, illustrated in FIG. 2, to an extended position wherein an end 56 of the display rod 42 is located externally of the case 41. Flexible elastic membrane 45 is rigidly affixed to the case 41 and to the piston 43 so as to separate first chamber 46 from second chamber 47 in the internal space within the case 41.

First chamber 46 is connected by conduit 48 to the conduit 23 which is, in turn, connected to the fluid feed system at a point between the exit of the filter 2 and the inlet of the high pressure main pump 1. Second chamber 47 is connected by a conduit 49 and through the switching device 60 to either of the conduits 22 or 21 located upstream of the selected malfunctioning component. Piston 43 moves in translation along the longitudinal axis XX' when driven by the differential pressure between the chamber 46 and 47 against the force of biasing spring 50. The characteristics of the spring 50 are selected such that the piston 43 will move only when the pressure differential between chambers 46 and 47 exceeds a predetermined threshold value.

The drive means for the display rod 42 comprises a push button 44 rigidly attached to the piston 43 and located in an axial extension of the rod 42. The locking means for the display rod 42 is designed to keep the rod in either its retracted position, when there is no malfunction or in its extended position, when a malfunction has been detected. As illustrated in FIG. 2, the locking means comprises one or more elastic blades 52 extending along the rod 42 with the upper ends 53 of the blades 52 being attached to the case 41, while the lower ends 54 are free to clamp the rod 42. In one locking position, the elastic blades 52 cooperate with a retaining stud 55 located on the display rod 42 and illustrated as comprising a generally bi-conical configuration.

Monitoring of the position of the display rod 42 can be implemented by an electric display, such as pilot lights, by acoustic alarms, or by direct visual observation. In the case of direct visual observation, the extended end 56 of the rod 42 may be colored to serve as a display marker and the case 41 may be fitted with a transparent cover 57 to allow observation.

The switching device 60 comprises a generally cylindrical case 61 having slidably located therein a slider 62 with a circular channel or reduced crosssectional dimensional portion 63 located at the approximate middle of the slider. The slider is capable of moving between the two opposite ends of the case 61 against the force of spring 64 due to the pressure differential applied to the opposite ends 65, 66 of the slider 62. At its two opposite ends, the case 61 has fluid inlets 74, 75, connected by conduits 21 and 23 respectively, to the two pressurized fluid locations upstream of the booster pump and downstream of the filter. Case 61 also has an intermediate inlet and an intermediate outlet 67 and 68, respectively, such that the inlet 67 is connected by conduit 22 to a fluid pressure location between the booster pump and the filter, while the outlet 68 is connected by a conduit 49 to the chamber 47 of the indicating detector 40. In addition, in an upper zone of the peripheral surface, the case 61 has a first additional outlet 69 connected by a conduit 51 to the conduit 49. In a lower zone the case 61, a second additional outlet 70 is connected by conduit 71 to the test device 30.

The inlet 67 and the outlets 68 and 69 are controlled by the slider 62 such that they are either closed or open, depending upon the position of the slider within the case 61. The outlet 69 is closed or open, respectively, when the inlet and outlet 67 and 68 are open or closed, respectively. When the outlet 69 is closed, the conduit 49 communicates through the circular channel 63 of the slider 62 with conduit 22. When outlet 69 is open, the conduit 49 communications via conduit 51 with the conduit 21. The surface 66 of the slider 62 defines notches 72 whereby the connection between the conduit 71 and the conduit 23 downstream of the filter 2 can be maintained even when the slider 62 is located in its lowermost position against the end of case 61.

A diaphragm 73 is mounted in the conduit 23 upstream of the junction with the conduit 48, as illustrated in FIG. 2. This diaphragm is operative only when the test device 30 is being utilized, namely during maintenance checks to ensure the proper magnitude of the threshold pressure differential. Except for these maintenance procedures, the diaphragm 73 causes no pressure loss in the conduit 23.

In operation, the opposite facing surfaces 65 and 66 of the slider 62 in the switching device 60 are subjected on one hand, to the force of spring 64 against surface 66 thereby biasing the slider 62 to rest against the upper end of the case 61 (as viewed in FIG. 2) and, on the other hand, by conduits 21 and 23 to the pressure differential between the downstream side of the filter 2 and the upstream side of the booster pump 3. In the absence of any malfunctioning of the booster pump 3, the combined actions of spring 64 and the fluid pressure acting on end 66 of the slider 62 causes the slider 62 to rest against the upper end of the case 61 (as illustrated in FIG. 2) thereby closing the inlet 74 and the outlet 69. In this position of the slider 62, the pressure drop selected for monitoring by the switching device 60 is the pressure drop across the boundaries of the filter 2. In this position of the slider 62, the indicating detector 40 has chamber 47 being supplied by fluid $P_{AM}$ the pressure located upstream of the filter 2 but downstream of the booster pump 3 via conduit 49 through the circular channel 63 and the conduit 22. The other chamber 46 of the indicating detector 40 is supplied by fluid $P_{AV}$, the pressure downstream of the filter 2, but upstream of the main, high pressure pump 1 via conduit 48. In this instance, piston 43 and flexible membrane 45 are subjected to the force of spring 50 on the piston 43 with a biasing force to keep the piston 43 resting against the lower end of the case 41 (as viewed in FIG. 2). Also acting on the piston 43 and the flexible membrane 45 is the pressure differential between the upstream and downstream sides of the filter 2. In the absence of any clogging of the filter 2 and as long as the pressure drop across the filter is less than a predetermined threshold value, the combined actions of the spring 50 and the pressure differential across the membrane 45 and piston 43, keep the piston 43 resting against the lower inside surface of the case 41. In that position, the indicating rod 42 is retracted and the alarm indicator is not actuated.

As the clogging of the filter 2 increases, the pressure drop between the inlet and the outlet of the filter also increases, thereby causing the pressure $P_{AV}$ downstream of the filter to decrease. When the pressure drop across the filter reaches the predetermined threshold value, the actions of the pressures acting on opposite sides of the membrane 45 and the piston 43 urge the piston upward (as illustrated in FIG. 2) against the force of spring 50 in the direction of arrow F1. This displacement of piston 43 drives the pushbutton 44 which, in turn, causes the indicator rod 42 to move out of the housing 41 to its extended position. During this movement of the alarm indicator 56, the bi-conical shoulder 55 of the rod 42 spreads apart the lower ends 54 of the elastic blades of the locking system. Once the alarm indicator has reached its extended position, the larger diameter of the shoulder 55 has passed beyond the ends of the blades 54 which lock the rod in its extended, indicator position, indicative of a malfunction of the filter.

If the booster pump 3 should malfunction, caused for instance by a fracture in its rotor drive shaft, the pressure $P_{AM}$ will be very low and will be approximately equal to the fuel supply pressure $P_{CA}$ less a small pressure drop through the booster pump. Similarly, the pressure $P_{AV}$ downstream of the filter 2 also decreases. The characteristics of spring 64 in the switching device 60 are selected such that, under these conditions, the forces applied by the pressure $P_{AV}$ and the spring 64 on the surface 66 of slider 62 become less than the force exerted by pressure $P_{CA}$ on the surface 65 of the slider 62. This pressure differential causes the slider to move downwardly, in a direction indicated by arrow $F_2$ in FIG. 2 toward the lower end of the case 61, compressing the spring 64 and coming to rest at the bottom of the inner surface of the case 61. Such movement closes the inlet 67 and the outlet 68 while opening inlet 74 and outlet 69. When the slider is in this position, the switching device 60 monitors the pressure drop associated with the malfunctioning of the booster pump 3. In this instance, the indicating detector 40 has pressure $P_{CA}$ applied to chamber 47, which pressure is measured upstream of the booster pump 3, via conduits 49, 51 and 21. Pressure $P_{AV}$ is applied to chamber 46, which pressure being downstream of the filter 2, via conduits 48 and 23.

Under these conditions, the pressures on either side of the membrane 45 and the piston 43 are similar to those of the aforedescribed filter clogging and will bias the piston 43 against the force of spring 50 in the direction denoted by arrow F1 when this pressure differential exceeds a predetermined threshold value. Such piston movement extends the indicator alarm 56 to indicate damage to the booster pump.

Once a malfunction has been detected, the magnitude of the predetermined reference threshold pressure differential is checked. The check is carried out by opening valve 31 to create a leak in the conduit 23 through the now effective diaphragm 73. A pressure drop is created and the pressures upstream of the diaphragm 73 and present in the chamber 46 of the indicating detector 40 and on the surface 66 of the slider 62 then decrease. The magnitude of the leak is increased until the pressure drop in the diaphragm 73 reaches a sufficient value to cause the alarm indicator to "pop out". The manometer 32 permits checking the pressure upstream of the diaphragm, to infer therefrom that the magnitude of the pressure drop causing the extension of the alarm indicator 56 and to compare this value with the predetermined threshold value corresponding to the proper operation of the monitoring apparatus 20.

The foregoing description is provided for illustrative purposes, and should not be construed as in any way limiting this invention, the scope of which is defined solely by the appended claims.

I claim:

1. An apparatus for detecting operational anomalies in a pressurized fluid circuit having a main pump, a fluid filter and a booster pump connected in series comprising:

a) an indicating detector comprising a case having first and second internal chambers separated by a flexible membrane and an alarm indicator extending externally of the case when the pressure differential between the first and second chambers reaches a predetermined threshold value;

b) a switching device comprising a case having opposite first and second ends, a slider movable within the switching device case between the opposite ends thereof, the slider having a middle portion with a reduced cross-sectional dimension, the switching device case having a first inlet in the first end, a second inlet in the second end and a third inlet in a middle portion;

c) first means supplying fluid pressure upstream of the booster pump ($P_{CA}$) to the first inlet;

d) second means supplying fluid pressure between the fluid filter and the main pump ($P_{AV}$) to the second inlet and to the first chamber of the indicating detector;

e) third means supplying fluid pressure between the booster pump and the fluid filter ($P_{AM}$) to the third inlet; and, f) fourth means connecting the second chamber of the indicating detector to the switching device whereby fluid pressure $P_{AM}$ is applied to the second chamber when the slider is in a first position and fluid pressure $P_{CA}$ is applied to the first chamber when the slider is in a second position.

2. The apparatus of claim 1 further comprising biasing means acting on the slider so as to normally bias the slider in its first position whereby the slider is moved to its second position when pressure differential ($P_{CA}$-$P_{AV}$) reaches a predetermined threshold value.

3. The apparatus of claim 1 wherein the alarm indicator comprises an elongated display rod axially movable relative to the indicating detector case.

4. The apparatus of claim 3 further comprising drive means to move the elongated display rod when the pressure differential between the first and second chambers reaches the predetermined threshold value.

5. The apparatus of claim 4 wherein the drive means comprises:

a) a piston connected to the flexible membrane;

b) second biasing means acting on the piston; and c) a pushbutton affixed to the piston and acting on the display rod, whereby the second biasing means biases the piston to a position wherein the rod is retracted.

6. The apparatus of claim 5 wherein the flexible membrane is fixedly attached to the piston and to the indicating detector case.

7. The apparatus of claim 3 wherein the elongated display rod is movable between a retracted position and an extended position and further comprising locking means to retain the display rod in its extended position.

8. The apparatus of claim 7 wherein the locking means comprises:
   a) an enlarged retention portion on the display rod;
   b) a plurality of elastic blades having distal ends cooperating with the enlarged retention portion so as to retain the display rod in its extended position.

* * * * *